US012176789B2

(12) United States Patent
Colle et al.

(10) Patent No.: US 12,176,789 B2
(45) Date of Patent: Dec. 24, 2024

(54) ROTATING ELECTRICAL MACHINE WITH SUPERCONDUCTING ELEMENTS AND CRYOGENIC ENCLOSURES

(71) Applicants: UNIVERSITE DE LORRAINE, Nancy (FR); SAFRAN, Paris (FR)

(72) Inventors: Alexandre Colle, Moissy-Cramayel (FR); Sabrina Siham Ayat, Moissy-Cramayel (FR); Rémy Biaujaud, Moissy-Cramayel (FR)

(73) Assignees: UNIVERSITE DE LORRAINE, Nancy (FR); SAFRAN, Paris (FR)

( * ) Notice: Subject to any disclaimer, the term of this patent is extended or adjusted under 35 U.S.C. 154(b) by 211 days.

(21) Appl. No.: 17/911,085

(22) PCT Filed: Mar. 11, 2021

(86) PCT No.: PCT/FR2021/050418
§ 371 (c)(1),
(2) Date: Sep. 12, 2022

(87) PCT Pub. No.: WO2021/181049
PCT Pub. Date: Sep. 16, 2021

(65) Prior Publication Data
US 2023/0147036 A1 May 11, 2023

(30) Foreign Application Priority Data
Mar. 13, 2020 (FR) ...................................... 2002484

(51) Int. Cl.
*H02K 55/04* (2006.01)
*B64D 27/24* (2006.01)

(52) U.S. Cl.
CPC ............. *H02K 55/04* (2013.01); *B64D 27/24* (2013.01); *B64D 2221/00* (2013.01)

(58) Field of Classification Search
CPC ........ H02K 55/00; H02K 55/02; H02K 55/04; H02K 16/00; H02K 16/02; H02K 16/04;
(Continued)

(56) References Cited

U.S. PATENT DOCUMENTS 3,564,307 A * 2/1971 Kawabe ................ H02K 55/00
310/10
3,673,444 A * 6/1972 Kawabe ................ H02K 55/00
310/10

FOREIGN PATENT DOCUMENTS

EP 2 037 558 A1 3/2009
EP 2 611 007 A2 7/2013

OTHER PUBLICATIONS

Colle et al., "Analytical Model for the Magnetic Field Distribution in a Flux Modulation Superconducting Machine", IEEE Transactions On Magnetics, Dec. 12, 2019, vol. 55, No. 12, total 9 pages.
(Continued)

*Primary Examiner* — Tran N Nguyen
(74) *Attorney, Agent, or Firm* — BIRCH, STEWART, KOLASCH & BIRCH, LLP

(57) ABSTRACT

Disclosed is a rotating electrical machine with axial air gap, comprising two rotors, each provided with superconducting axial magnetic flux barrier elements around an axis of rotation and having, between them, axial magnetic flux passage areas, at least one armature, comprising windings and a superconducting field coil surrounding the elements and the armature and capable of inducing an axial magnetic field. Each armature is positioned between two of the rotors. The superconducting elements of the rotors are coaxial with one another and also the flux passage areas. A first annular cryogenic enclosure encloses the field coil and a second cryogenic enclosure encloses the two rotors and the arma-
(Continued)

Figure 1:
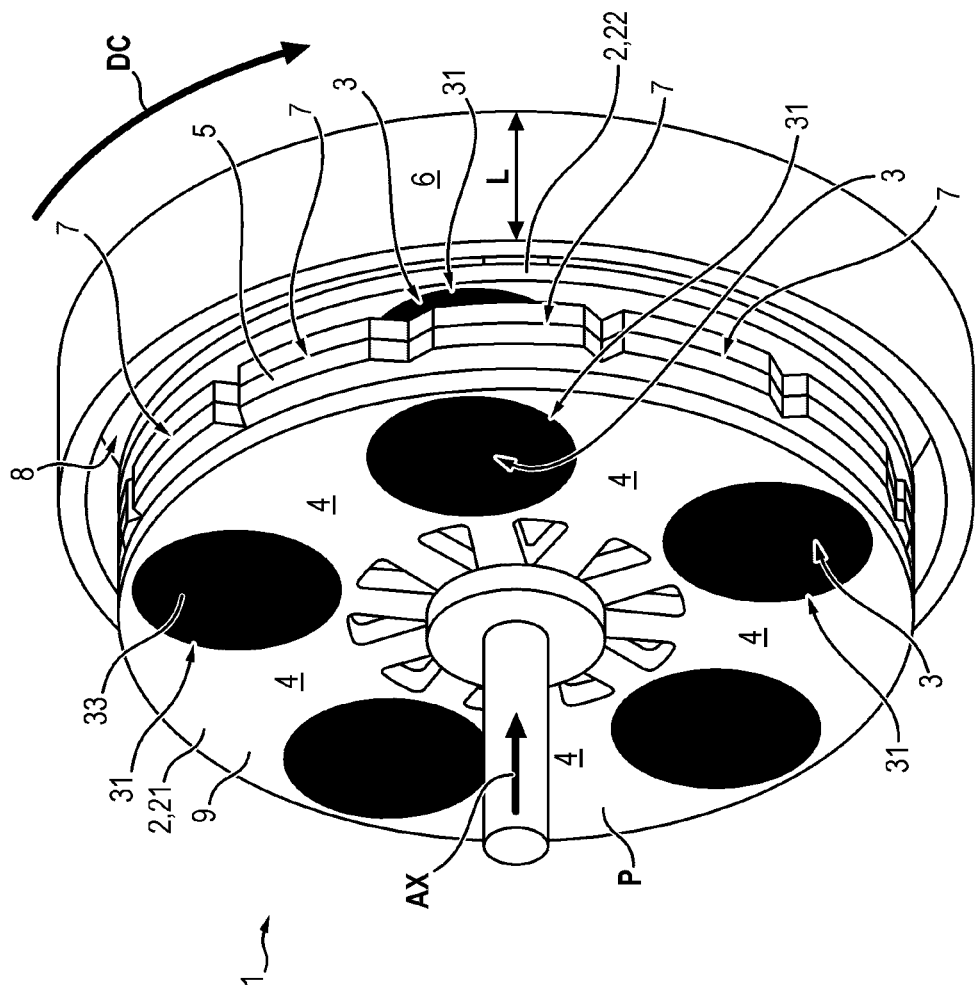

ture or only one rotor, with a third cryogenic enclosure around the other rotor without the armature.

27 Claims, 13 Drawing Sheets

(58) Field of Classification Search
CPC ........ H02K 19/00; H02K 19/24; H02K 19/10; H02K 19/20; H02K 19/103; H02K 1/00; H02K 1/06; H02K 1/18; H02K 1/182; H02K 1/24; H02K 1/243; H02K 1/246; B64D 27/00; B64D 27/24
See application file for complete search history.

(56) References Cited

OTHER PUBLICATIONS

Colle et al., Evaluation des Pertes dans une Machine Supraconductrice à Modulation de Flux, "https://hal.archives-ouvertes.fr/hal-01910634", 2018, total 6 pages.
International Search Report for PCT/FR2021/050418 mailed on Jun. 14, 2021.
Masson et al., "Design of HTS Axial Flux Motor for Aircraft Propulsion", IEEE Transactions On Applied Superconductivity, IEEE Service Center, Los Alamitos, CA, US, vol. 17, No. 2, Jun. 2, 2007, pp. 1533-1536.
Written Opinion of the International Searching Authority for PCT/FR2021/050418 mailed on Jun. 14, 2021.
Zhou et al., "Topical Review; An overview of rotating machine systems with high-temperature bulk superconductors", Superconductor Science and Technology, IOP Publishing, Techno House, Bristol, GB, vol. 25, No. 10, Aug. 8, 2012, 103001, pp. 1-12.

* cited by examiner

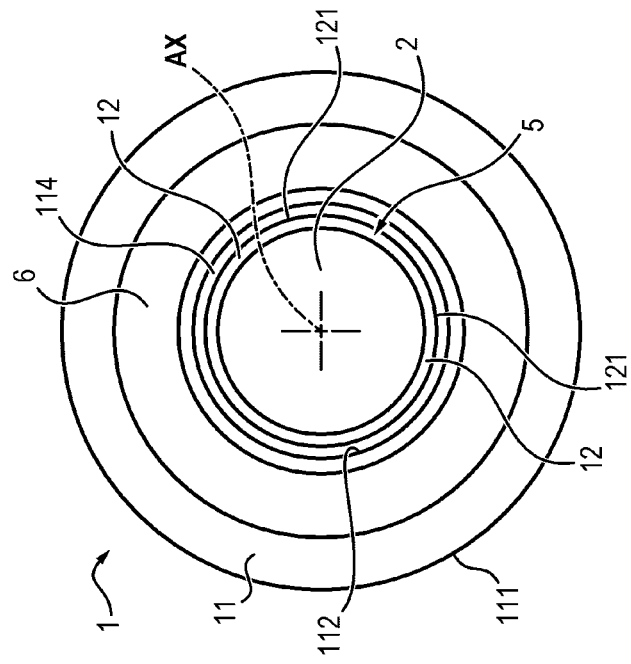
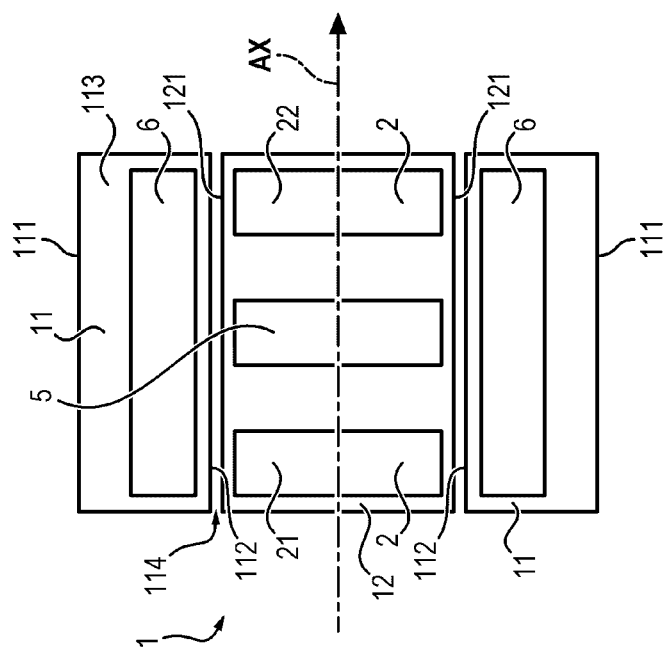

ROTATING ELECTRICAL MACHINE WITH SUPERCONDUCTING ELEMENTS AND CRYOGENIC ENCLOSURES

The invention relates to a rotating electric machine.

A field of application of the invention relates to electricity generators and motors supplied with electricity, to equip means of transport, such as aircrafts for example airplanes or helicopters.

Rotating machines are known, comprising on their rotor, superconducting flux barrier pads inside an axial flux inductor coil, and one or two armature(s) during their operation as a generator. The rotation of the pads creates a modulation of the magnetic flux in the armature(s) between a minimum value created behind the pads and a maximum value created between the pads, thereby enabling to generate an electromotive force therein.

However, for applications requiring a large energy density, it is necessary to have a large difference between the maximum value and the minimum value of the magnetic flux in the armature, the modulation amplitude being directly proportional to the electromagnetic force created (Faraday's law).

Thus, in these known machines, it turns out that the minimum value of the magnetic flux in the armature is quite high.

The invention aims to obtain a rotating electric machine with superconducting elements, which allows reducing the minimum value of the magnetic flux in the armature while having a large maximum value of the magnetic flux in the armature.

To this end, a first subject matter of the invention is a rotating electric machine, comprising:

at least one rotor comprising a set of superconducting axial magnetic flux barrier elements distributed in a plane perpendicular to the axis of rotation in a tangential direction about the axis of rotation, said superconducting axial magnetic flux barrier elements being spaced by axial magnetic flux passage areas distributed in the tangential direction about the axis of rotation, at least one armature, comprising armature windings distributed in the tangential direction about the axis of rotation, at least one superconducting inductor coil surrounding the superconducting axial magnetic flux barrier elements and the at least one armature in the tangential direction about the axis of rotation, the at least one superconducting inductor coil being able to induce an axial magnetic field directed along the axis of rotation, the at least one rotor being rotatably mounted on the axis of rotation with respect to the armature and to the at least one inductor coil, characterized in that the machine comprises as a rotor at least one first rotor and at least one second rotor, the at least one first rotor and the at least one second rotor being spaced from each other along the axis of rotation, the at least one armature being positioned between the at least one first rotor and the at least one second rotor, the superconducting axial magnetic flux barrier elements of the at least one first rotor being coaxial at least partly with the superconducting axial magnetic flux barrier elements of the at least one second rotor, the axial magnetic flux passage areas of the at least one first rotor being coaxial at least partly with the axial magnetic flux passage areas of the at least one second rotor.

Thanks to the invention, the modulation of the flux is improved by reducing the minimum value of the flux in the armature(s) and by increasing the difference between the maximum value of the flux and the minimum value of the flux in the armature(s).

According to an embodiment of the invention, the at least one second rotor comprises an armature on either side.

According to an embodiment of the invention, the rotating electric machine comprises N rotors comprising on either side of each of the rotors an armature, N being a natural number greater than or equal to 2.

According to an embodiment of the invention, the at least one armature comprises a rotor on either side.

According to an embodiment of the invention, the rotating electric machine comprises N armatures comprising on either side of each of the armatures a rotor, N being a natural integer greater than or equal to 2.

According to an embodiment of the invention, the superconducting axial magnetic flux barrier elements of the at least one first rotor are aligned along the axis of rotation with the superconducting axial magnetic flux barrier elements of the at least one second rotor, and the axial magnetic flux passage areas of the at least one first rotor are aligned along the axis of rotation with the axial magnetic flux passage areas of the at least one second rotor.

According to an embodiment of the invention, the armature windings comprise at least one superconducting armature winding.

According to an embodiment of the invention, the armature windings comprise at least one conductive winding.

According to an embodiment of the invention, the at least one superconducting inductor coil has an axial extent, which surrounds the plurality of the rotors and the at least one armature in the tangential direction about the axis of rotation.

According to an embodiment of the invention, the machine comprises a single superconducting inductor coil.

According to an embodiment of the invention, the rotating electric machine includes a cryogenic cooling enclosure, inside which the rotors, the at least one armature and the at least one superconducting field coil are placed.

According to an embodiment of the invention, the rotating electric machine comprises a first cryogenic cooling enclosure, which has an annular shape about the axis of rotation and which is delimited radially by a first external wall and by a second internal annular wall, the at least one superconducting inductor coil being located in the first cryogenic cooling enclosure between the first external wall and the second internal annular wall, the machine comprising a second cryogenic cooling enclosure, which has a circular cylindrical shape about the axis of rotation and which is delimited radially by a third external wall located inside the second internal annular wall, the rotors and the at least one armature being located in the second cryogenic cooling enclosure.

According to an embodiment of the invention, the rotating electric machine comprises a first cryogenic cooling enclosure, which has an annular shape about the axis of rotation and which is delimited radially by a first external wall and by a second internal annular wall, the at least one superconducting inductor coil being located in the first cryogenic cooling enclosure between the first external wall and the second internal annular wall, the machine comprising at least one second cryogenic cooling enclosure, which has a circular cylindrical shape about the axis of rotation and which is delimited radially by a third external wall located inside the second internal annular wall, the at least one first rotor being located in the second cryogenic cooling enclosure, the machine comprising at least one third cryogenic cooling enclosure, which has a circular cylindrical shape about the axis of rotation, which is located axially at a distance from the second cryogenic cooling enclosure and which is delimited radially by a fourth external wall located inside the second internal annular wall, the at least one second rotor being located in the third cryogenic cooling enclosure, the at least one armature being located between the second cryogenic cooling enclosure and the third cryogenic cooling enclosure.

According to an embodiment of the invention, at least one of the superconducting axial magnetic flux barrier elements comprises at least one full superconducting axial magnetic flux barrier pad.

According to an embodiment of the invention, at least one of the superconducting axial magnetic flux barrier elements comprises at least one superconducting axial magnetic flux barrier loop.

A second subject matter of the invention is an aircraft, comprising an electricity-consuming member or an electricity-generating member and a rotating electric machine as described above, which is connected to a circuit for connection to the electricity-consuming member or to the electricity-generating member to allow supplying it or providing it with electricity.

The invention will be better understood upon reading the following description, given solely by way of non-limiting example with reference to the figures of the appended drawings.

FIG. 1 schematically represents in perspective a machine 1 according to a first embodiment of the invention.

Figure 2:
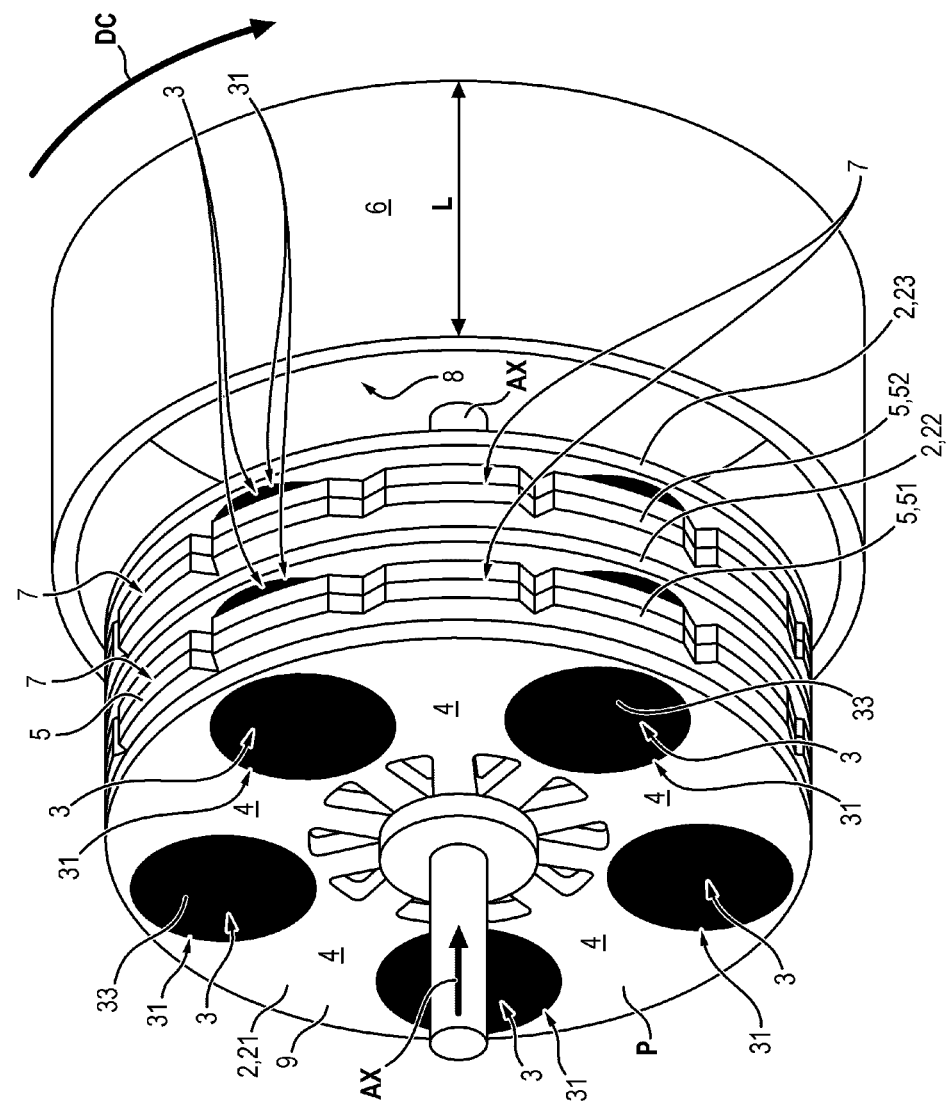

FIG. 2 schematically represents in perspective a machine 1 according to a second embodiment of the invention.

Figure 3:
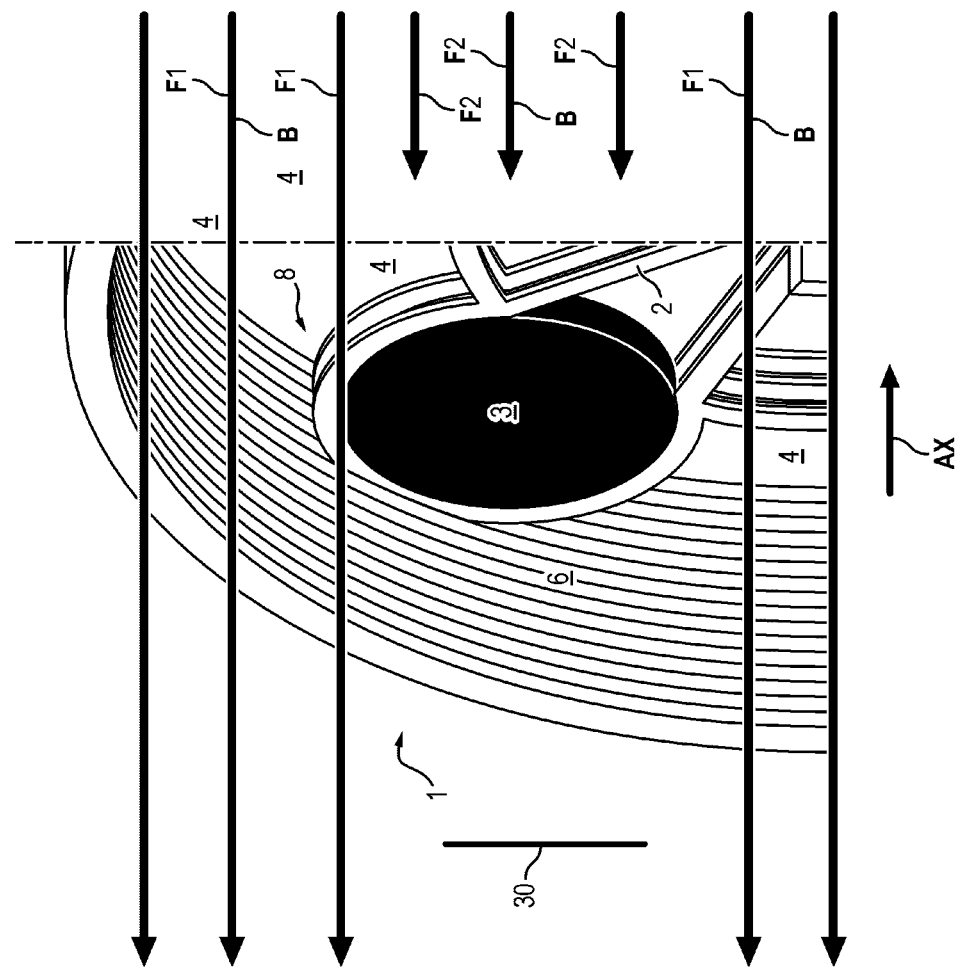

FIG. 3 schematically represents in perspective part of a machine 1 according to a third embodiment of the invention.

Figure 4:
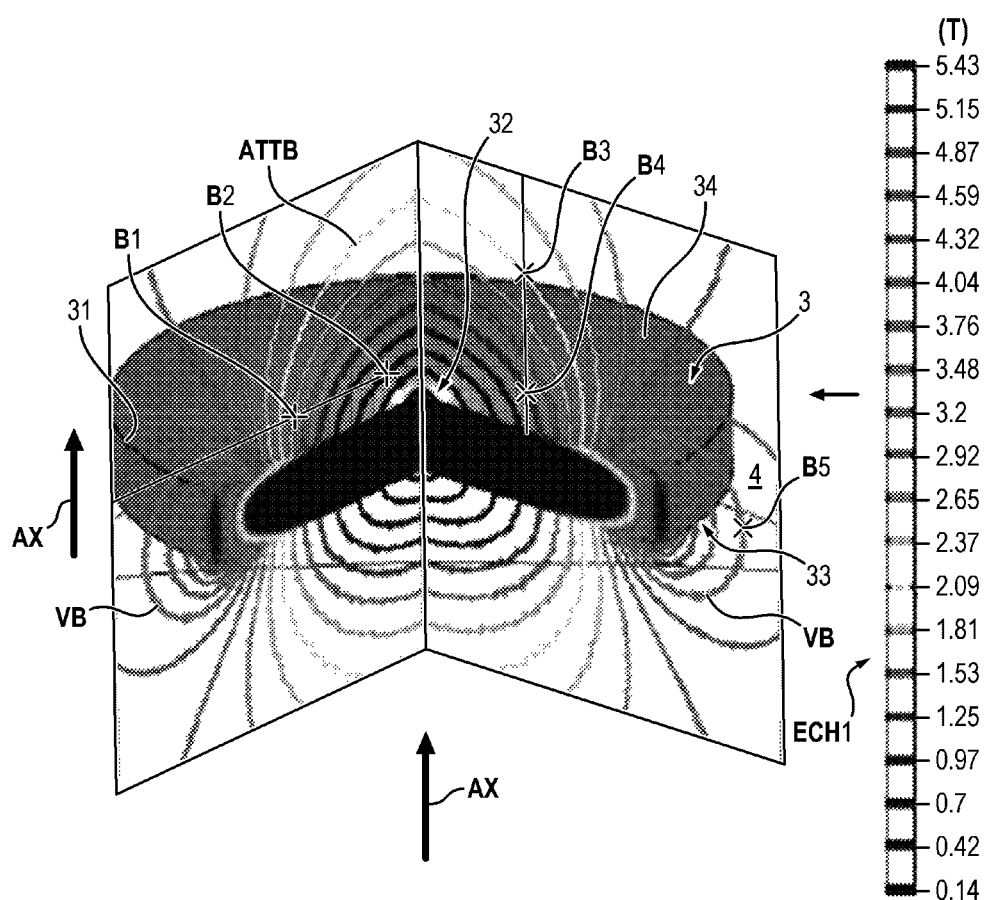

FIG. 4 is a perspective view in two section planes of the magnetic flux isolines around and in a superconducting magnetic flux barrier element that can be used in a rotating electric machine generating electricity according to an embodiment of the invention.

Figure 5:
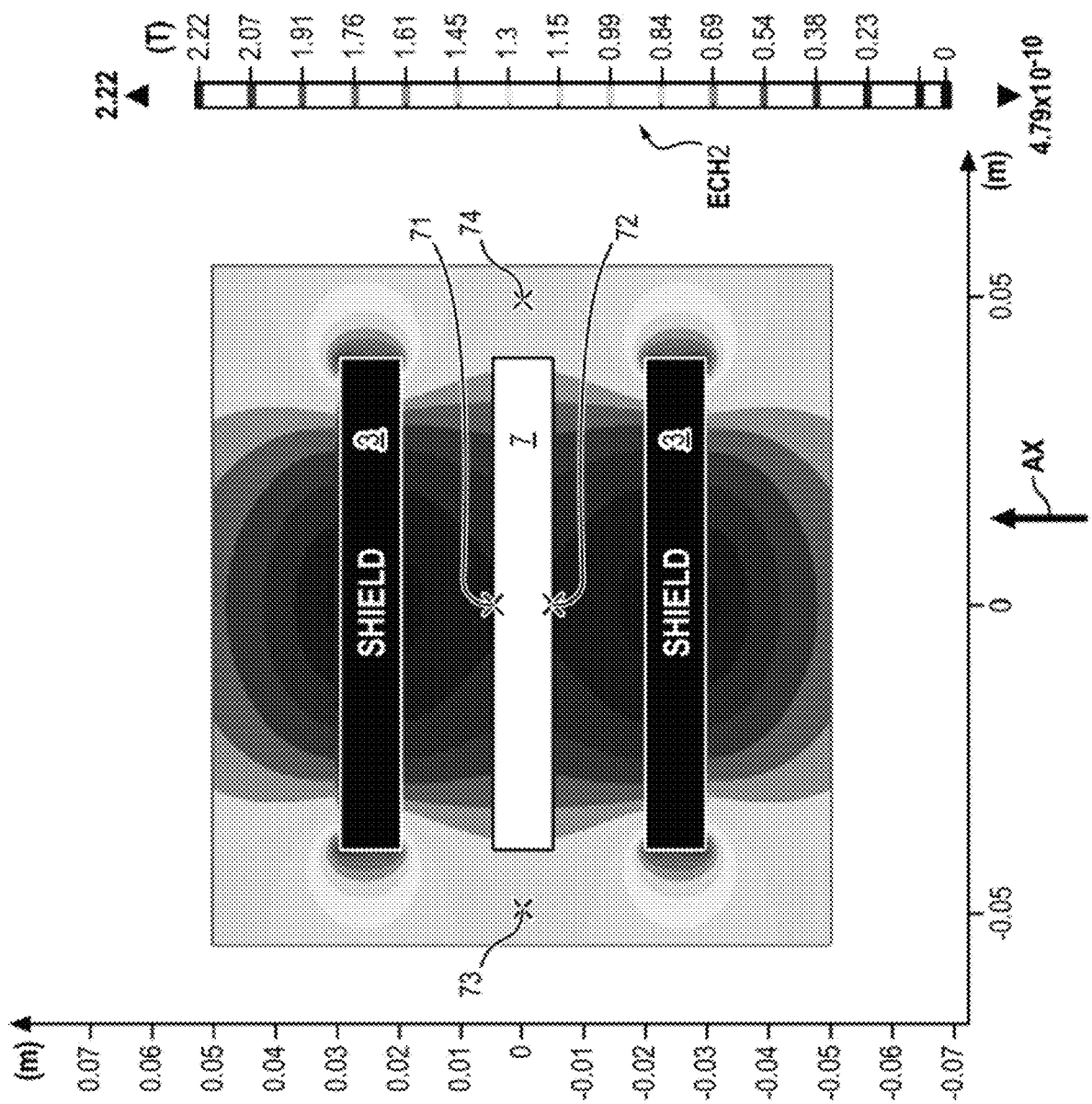

FIG. 5 schematically represents the value of the magnetic field for a first example of a machine 1 according to the invention.

Figure 6:
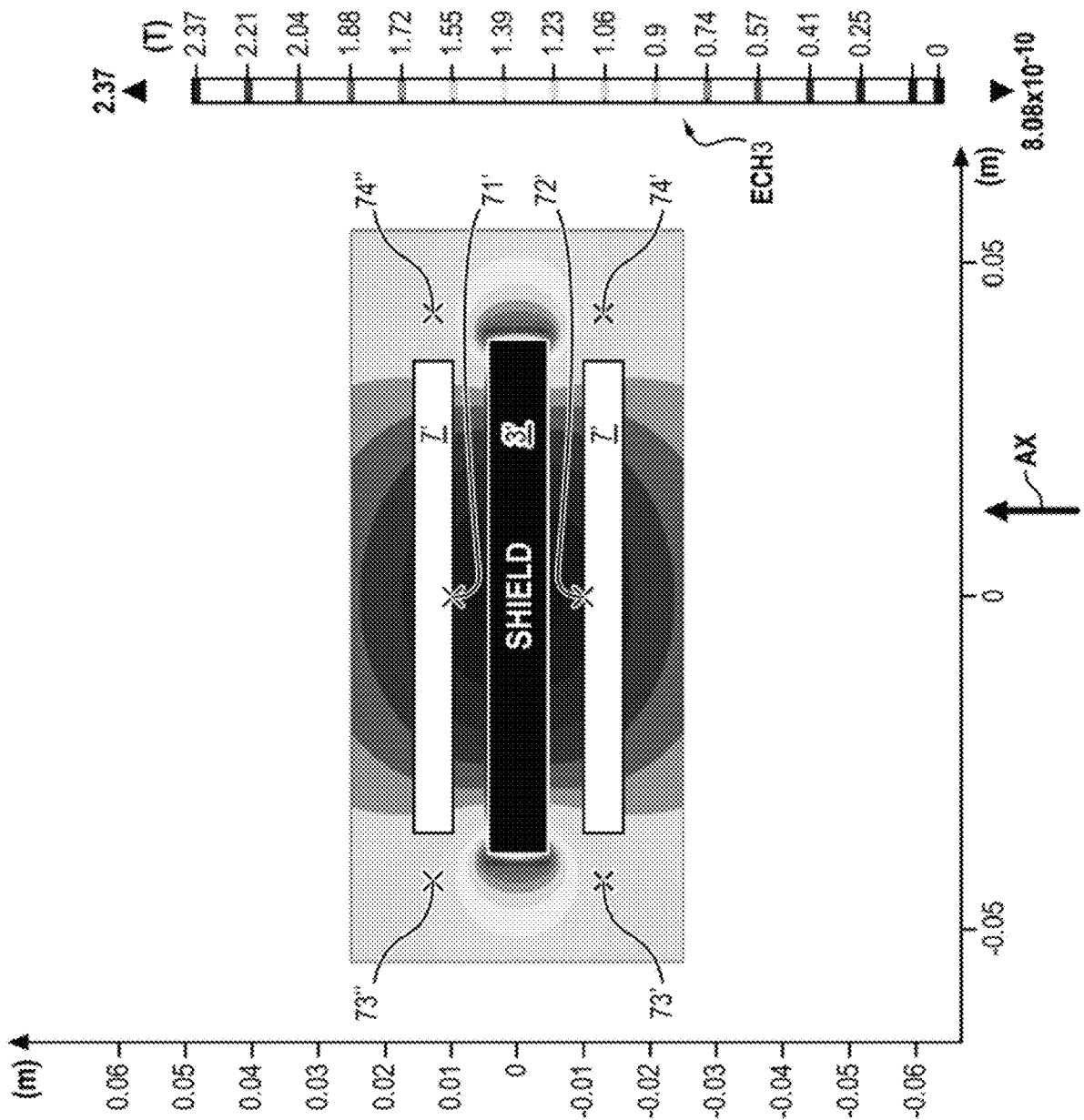

FIG. 6 schematically represents the value of the magnetic field for a second comparative example of a machine 1 not falling within the scope of the invention.

Figure 7:
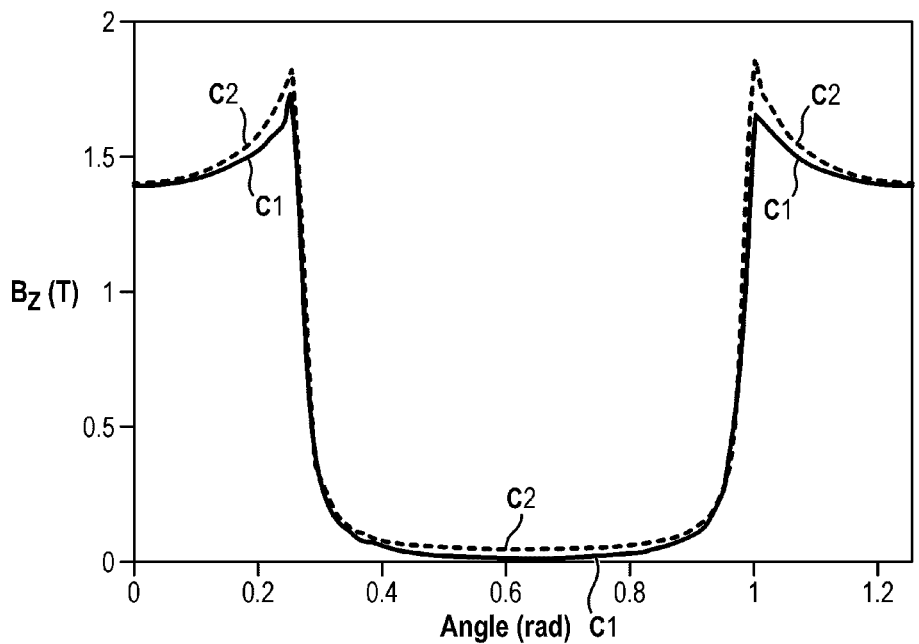

FIG. 7 schematically represents curves of the axial component of the magnetic induction generated by a machine according to the first example of the invention and according to the second comparative example at a point located between a rotor and an armature.

Figure 8:
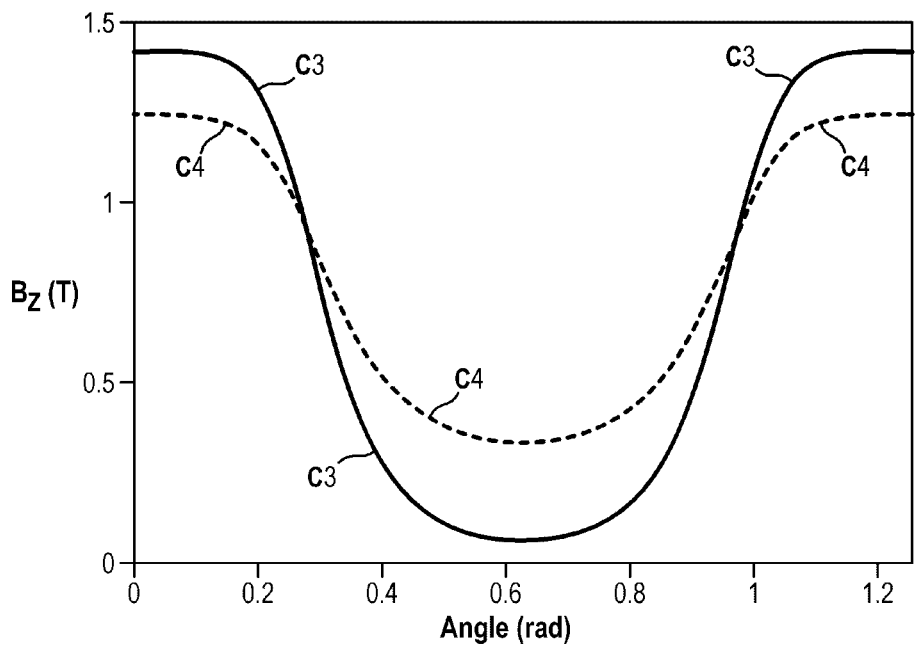

FIG. 8 schematically represents curves of the axial component of the magnetic induction generated by a machine according to the first example of the invention and according to the second comparative example at a point located on an armature winding.

Figure 9:
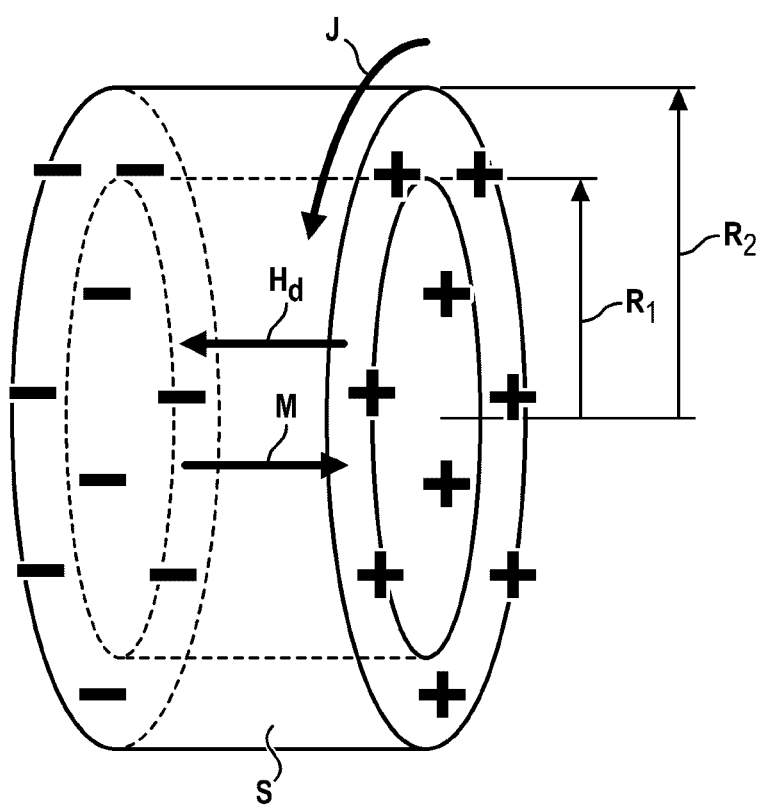

FIG. 9 schematically represents in perspective a solenoid that can be used in the machine according to the invention.

Figure 10:
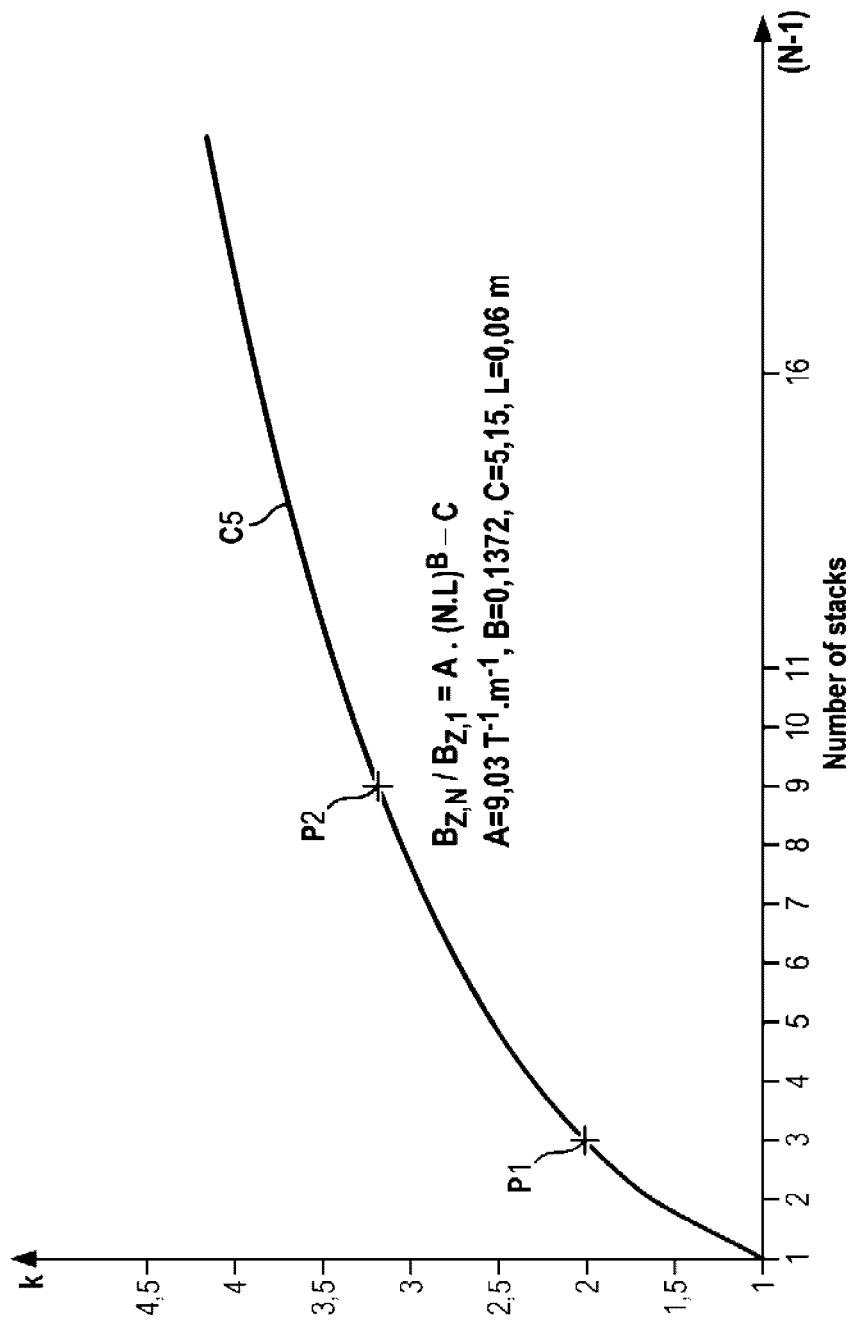

FIG. 10 represents the evolution of the induction as a function of the number of stacks of rotors of the machine according to the invention.

Figure 11:
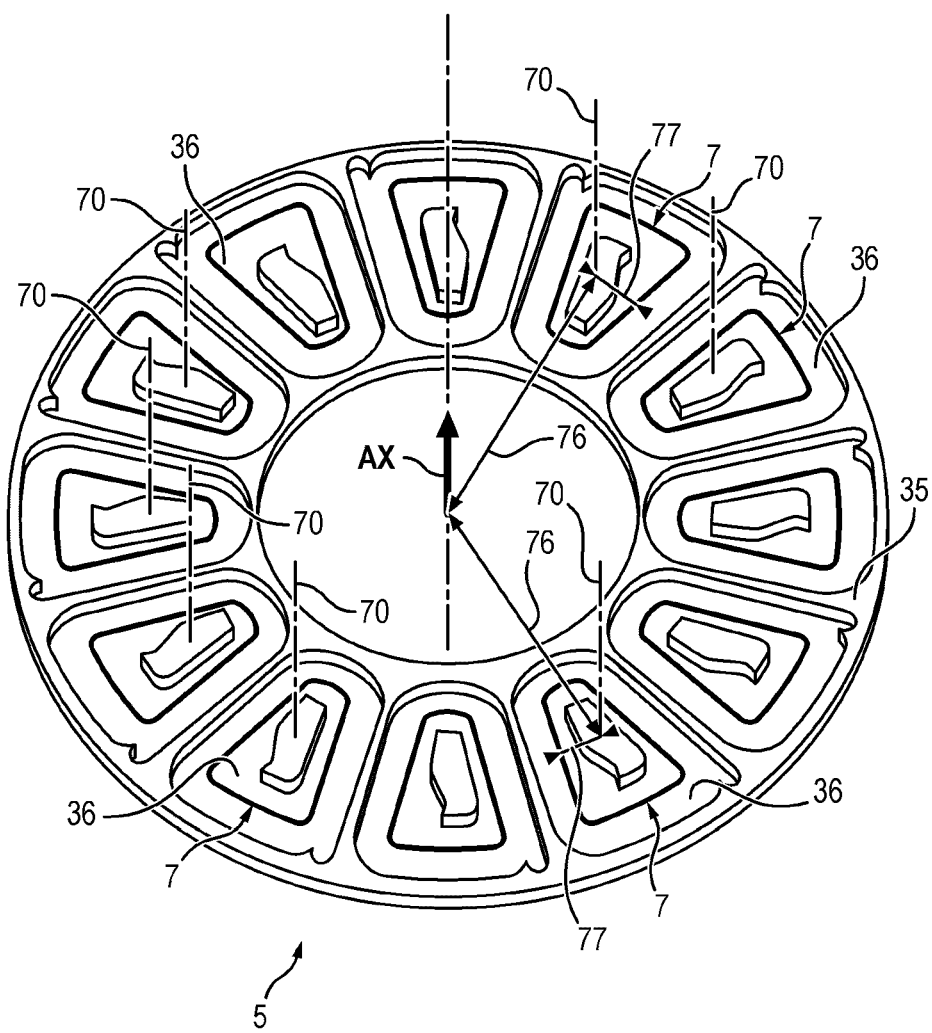

FIG. 11 schematically represents a cryostat cap that can be used in the machine according to the invention.

Figure 12:
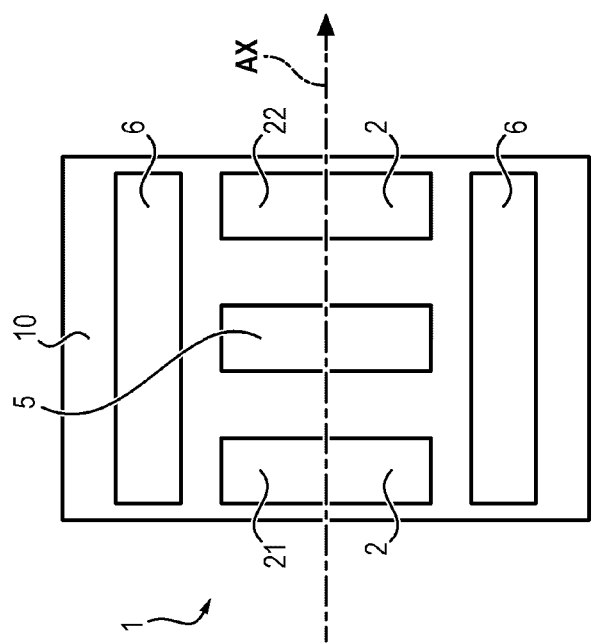

FIG. 12 schematically represents a side view of a machine according to an embodiment of the invention.

Figure 13:
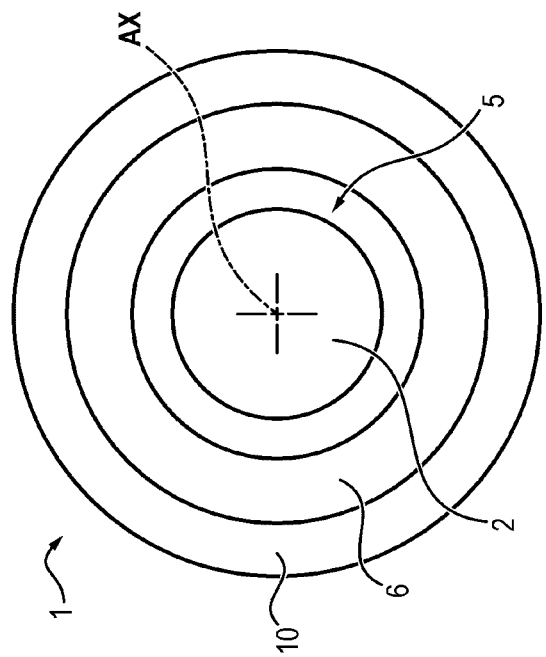

FIG. 13 schematically represents a front view of a machine according to FIG. 12.

FIG. 14 schematically represents a side view of a machine according to another embodiment of the invention.

FIG. 15 schematically represents a front view of a machine according to FIG. 14.

Figure 16:
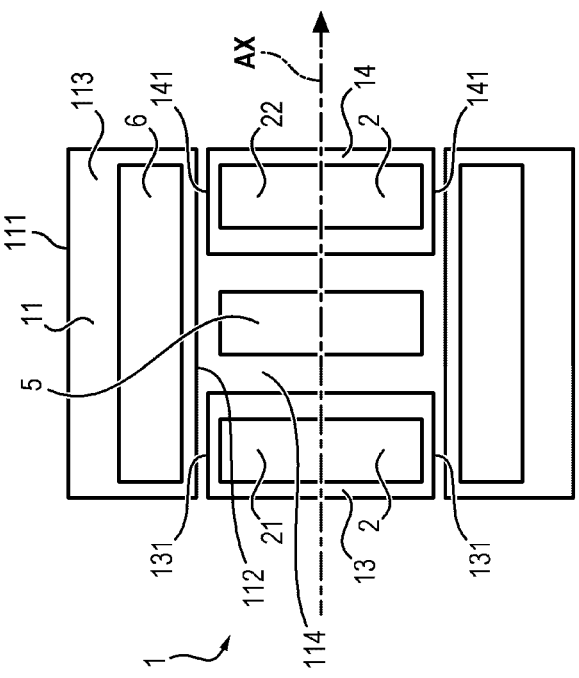

FIG. 16 schematically represents a side view of a machine according to another embodiment of the invention.

Figure 17:
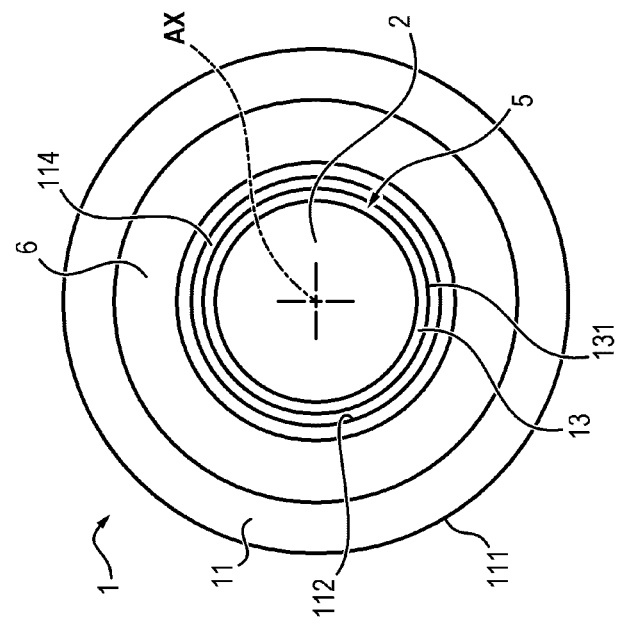

FIG. 17 schematically represents a front view of a machine according to FIG. 16.

In FIGS. 1, 2 and 3, in a flux barrier electric machine 1 comprising superconducting axial magnetic flux barrier elements 3, the modulation of the magnetic flux depends directly on the position of the shields that oppose the passage of the flux with respect to the windings 7 of the armature 5 (generator operation) or of the inductor (motor operation).

In FIGS. 1, 2 and 3, the rotating electric machine 1 is with axial flux and with flux barriers. The machine 1 comprises several rotors each generally designated by the reference 2, which can be for example two or three rotors 21, 22 and 23 in FIGS. 1 and 2, or which can be other. The rotating electric machine 1 thus comprises one or several first rotor(s), designated by the reference 21 in FIGS. 1, 2 and 3, and one or several second rotor(s), designated by the reference 22 in FIG. 1 and by the references 22 and 23 in FIG. 2. The terms "axial" and "coaxial" mean extending along the axis of rotation AX. The radial directions are located in planes perpendicular to the axis of rotation AX and start from the axis of rotation AX. The rotors 2 are secured to each other on a shaft or axis of rotation AX. Each rotor 2 comprises a set of superconducting axial magnetic flux barrier elements 3, which are distributed in the tangential direction DC around the axis of rotation AX and which lie in a plane perpendicular to the axis of rotation AX. Between the superconducting axial magnetic flux barrier elements 3 of each rotor 2, 21, 22, 23 are located axial magnetic flux passage areas 4 which are distributed in the tangential direction DC around the axis of rotation AX and which lie in the plane perpendicular to the axis of rotation AX. The rotors 2, 21, 22, 23 are successively spaced from each other along the axis of rotation AX.

In an embodiment, each superconducting axial magnetic flux barrier element 3 of one of the rotors 2 (which can be for example the first rotor 21) is coaxial at least partially with another superconducting axial magnetic flux barrier element 3 of the other rotor(s) 2 (which can be for example the second rotor(s) 22, 23). Thus, at least part of each superconducting axial magnetic flux barrier element 3 of one of the rotors 2 (which can be for example the first rotor 21) is coaxial with at least part of another superconducting axial magnetic flux barrier element 3 of the other rotor(s) 2 (which can be for example the second rotor(s) 22, 23).

Each axial magnetic flux passage area 4 of one of the rotors 2 (which can be for example the first rotor 21) is at least partially coaxial with another axial magnetic flux passage area 4 of the other rotor(s) 2 (which can be for example the second rotor(s) 22, 23). Thus, at least part of each axial magnetic flux passage area 4 of one of the rotors 2 (which can be for example the first rotor 21) is coaxial with at least part of another axial magnetic flux passage area 4 of the other rotor(s) 2 (which can be for example the second rotor(s) 22, 23).

The machine 1 comprises one (or several) superconducting inductor coil(s) 6, which is/are able to induce an axial magnetic field which is directed along the axis of rotation AX and which can be a DC magnetic field. For that purpose, the superconducting inductor coil 6 can comprise external electric terminals (not represented) serving to connect it to a DC electric voltage or to a DC current source, to produce the axial magnetic field. The superconducting inductor coil 6 is annular around the axis of rotation AX in the tangential direction DC and surrounds the superconducting axial magnetic flux barrier elements 3 of the rotors 2 and the armature(s) 5. The superconducting inductor coil 6 creates an intense magnetic field B, thanks to high current densities circulating in this coil 6, which can be for example 25 times greater than the current density of copper.

The machine 1 comprises one or several armature(s) (or stator(s)), which is/are each generally designated by the reference 5, such as for example the armature(s) 51 and 52. Each armature 5 comprises armature windings 7 which are distributed in the tangential direction DC around the axis of rotation AX.

The rotating electric machine 1 can operate in electricity-generating mode on the armature(s) 5 or in motor mode supplied with electricity on the armature(s) 5.

According to one embodiment, each armature winding 7 can form, for example, a loop that does not surround the axis of rotation AX and comprises one or several conductor(s) forming a loop that does not surround the axis of rotation AX. This is illustrated by way of non-limiting example in FIG. 11. Each auxiliary (geometric) direction 70 around which each armature winding 7 extends can be substantially parallel to the axis of rotation AX or have a component parallel to the axis of rotation AX. Thus, this auxiliary direction 70 of the winding (for example substantially parallel to the axis of rotation AX) is located at a first non-zero distance 76 from the axis of rotation AX. Thus, the conductor(s) of the loop formed by each armature winding 7 is/are located at a second distance 77 with respect to its auxiliary direction 70, wherein this second distance is smaller than the first distance 76 and can be variable (as represented in FIG. 11) or constant around its auxiliary direction 70.

Each armature winding 7 can comprise other external electric terminals (not represented) used to connect it to an electric member, not represented. In the case where the rotating electric machine 1 operates in electricity-generating mode, each armature winding 7 allows sending to the electric receiving member the electric voltage (electromotive force) generated in this armature winding 7 by induction of the variable axial magnetic field moving in the tangential direction DC due to the rotation of the elements 3 of the rotors 2 around the axis of rotation AX. The electromotive force according to the Lenz-Faraday law is:

$$\varepsilon = -\frac{d\Phi}{dt}$$

where $\varepsilon$ is the electromagnetic force, $\Phi$ is the magnetic flux and t is the time. The elements 3 are brought closer with respect to the armature windings 7 along the axis AX to maximize the modulation of the flux and therefore the electromotive force generated in the armature windings 7.

The rotors 2 are rotatably mounted on the axis of rotation AX with respect to the armature(s) 5 and to the inductor coil 6, which are fixed to each other on a frame, not represented.

Each armature 5 is positioned between two of the rotors 2 in the direction along the axis of rotation AX.

In an embodiment represented in FIG. 1, the single armature 5 is positioned between the first rotor 21 and the second rotor 22.

In an embodiment represented in FIG. 2, the first armature 51 is positioned between the first rotor 21 and the second rotor 22, and the second armature 52 is positioned between the second rotor 22 and the other second rotor 23.

In general, the machine 1 has a first number N of rotors 2 successively spaced from each other along the axis of rotation AX, where N is a prescribed natural integer, which is greater than or equal to 2 or 3, and a second number N-1 of armatures 5 positioned successively between the N rotors 2 along the axis of rotation AX. The embodiments corresponding to N≥3 are hereinafter referred to as machine 1 with several stacks of rotors 2.

As represented in FIG. 3, when the machine 1 is in generator operation, the superconducting inductor coil 6 generates a magnetic field B (as represented by the long arrows F1 and the short arrows F2), which is directed along the axis of rotation AX in the interior space 8 it surrounds and in which the rotors 2 and the armature(s) 5 are located. Each superconducting axial magnetic flux barrier element 3 is configured to have a determined extent in the plane 30 perpendicular to the axis of rotation AX and create in this extent an obstacle (or shield) to the passage of the axial magnetic field B, as symbolized by the short arrows F2. For a temperature below their critical temperature (the critical temperature being for example below 100 K, or in particular below 50 K), the superconducting materials of the elements 3, of the inductor coil 6 and possibly of the armature windings 7 have a zero resistivity, which allows DC currents to circulate without losses. For a temperature lower than their critical temperature, the superconducting materials of the elements 3 have a diamagnetic response during the rise of the magnetic field B, that is to say act as a magnetic field barrier similar to the Meissner effect observed under very low field.

This shield or this barrier to the passage of the axial magnetic field B results in a strong attenuation ATTB of the value of the magnetic field in front of and behind the element 3 along the axis AX, this attenuation ATT being all the greater (that is to say, the value of the magnetic field B being all the smaller) as moving from the external edge 31 of the element 3 to the center 32 of the element 3 behind the rear face 33 of the element 3 and in front of the front face 34 of the element 3, as represented in FIG. 4, showing the magnetic flux isolines around and in the element 3 and their value expressed in Tesla (T) with reference to the first scale ECH1 of values.

In this FIG. 4, the superconducting pad forming the element 3 is circular cylindrical around the axis AX with a radius of 4 cm, is immersed in the constant axial magnetic field B of 3 T and has a critical current density of 1,000 A/mm2. FIG. 4 was obtained by calculation with a finite-element electromagnetic model (H-formulation). The majority of the current in the superconducting pads 3 develops on a thin thickness of penetration from their external surface. The penetration thickness depends on the intensity of the magnetic field in which the pad is immersed, as well as on its intrinsic electric properties. It can be noted that the penetration thickness is greater perpendicularly to the axis AX than along the axis AX. The thickness along the axis AX is proportional to the distance with respect to the center 32 of the pad. In general, the penetration thickness of the element 3 or of the pad 3 along the axis AX is relatively low, so as not to have degraded performances.

It can be seen in FIG. 4 that the value B1 of the magnetic field in the vicinity of the external edge 31 of the element 3 is greater than the value B2 of the magnetic field in the vicinity of the center 32 of the element 3 in the same plane perpendicular to the axis AX.

Similarly, this attenuation ATTB of the value of the magnetic field is all the lower (that is to say the value of the magnetic field is all the greater) as moving away from the element 3 parallel to the axis AX. It can indeed be seen in FIG. 4 that the value B3 of the magnetic field far from the element 3 is greater than the value B4 of the magnetic field at a distance closer to the element 3 in the same direction parallel to the axis AX.

On the other hand, the axial magnetic flux passage areas 4 allow values VB of the axial magnetic field B to pass, which are greater than those located in front of and behind the element 3. It can indeed be seen in FIG. 4 that the value B5 of the magnetic field transversely next to the element 3 is greater than the value B2 of the magnetic field in the vicinity of the center 32 of the element 3 in front and behind it.

The rotation of the rotors 2 around the axis AX generates through the armature(s) 5 a magnetic flux, which varies depending on whether a superconducting axial magnetic flux barrier element 3 of the rotors 2 or an axial magnetic flux passage area 4 passes axially facing the armature(s) 5.

In an embodiment represented in FIGS. 1 to 3, each superconducting axial magnetic flux barrier element 3 of one of the rotors 2 (which can be for example the first rotor 21) is aligned (that is to say is completely coaxial) along the axis of rotation AX with another superconducting axial magnetic flux barrier element 3 of the other rotor(s) 2 (which can be for example the second rotor(s) 22, 23), and each axial magnetic flux passage area 4 of one of the rotors 2 (which can be for example the first rotor 21) is aligned (that is to say is completely coaxial) along the axis of rotation AX with another axial magnetic flux passage area 4 of the other rotor(s) 2 (which can be for example the second rotor(s) 22, 23).

Each axial magnetic flux barrier superconducting element 3 can have an extent limited to a first determined non-zero angular sector around the axis of rotation AX, and each axial magnetic flux passage area 4 can have an extent limited to a second determined non-zero angular sector around the axis of rotation AX. For example, the first determined angular sector can be equal to the second determined angular sector.

Each armature winding 7 can have an extent limited to a third determined non-zero angular sector around the axis of rotation AX. The third determined angular sector can be less than or equal to the first determined angular sector. The third determined angular sector can be less than or equal to the second determined angular sector. The number of armature windings 7 on each armature 5 can be greater than or equal to the sum of the number of superconducting axial magnetic flux barrier elements 3 and of the number of axial magnetic flux passage areas 4 of each rotor 2, as represented in FIGS. 1 and 2. Thus, in each rotational position of the rotors 2 around the axis of rotation AX, when some armature windings 7 are axially facing superconducting axial magnetic flux barrier elements 3, other armature windings 7 are axially facing axial magnetic flux passage areas 4. Thus, during the rotation of the rotors 2 around the axis of rotation AX, successively very low and then very high values of magnetic fluxes are obtained in each armature winding 7.

FIG. 5 schematically represents a distribution calculated by the method of the finite elements for the value of the magnetic field, with reference to the second scale ECH2 of values in Tesla (T), and this around two axially aligned superconducting axial magnetic flux barrier elements 3, when an armature winding 7 is located between these two elements 3 and when a constant outer axial field is applied, and this without other elements 3 positioned along the axis of rotation AX, for a first example of a machine 1 according to the embodiment of the invention of FIG. 1, further having the following parameters: rated power of 50 kW, rated torque of 95 N.m, speed of rotation of 5,000 revolutions per minute, use temperature of 30 K, radius of the elements 3 of 40 mm, total weight of 20 kg, weight of each rotor of 4 kg.

FIG. 6 schematically represents a distribution calculated by the method of the finite elements for the value of the magnetic field, with reference to the third scale ECH3 of values in Tesla (T), and this around two other axially aligned armature windings 7', when a superconducting axial magnetic flux barrier element 3' identical to the element 3 in FIG. 5 is located between these two armature windings 7' when a constant outer axial field identical to that of FIG. 5 is applied, and this without other armature windings 7' and without other superconducting axial magnetic flux barrier element 3', according to a second comparative example not falling within the scope of the invention.

It can be seen in FIG. 5 that, although in FIG. 5 each superconducting axial magnetic flux barrier element 3 is axially further from the armature winding 7 than is each armature winding 7' with respect to the superconducting axial magnetic flux barrier element 3' in FIG. 6, the value (minimum value) of the magnetic field at the center 71, 72 of the front and rear faces of the armature winding 7 in FIG. 5 is lower (0.25 T) than the value (minimum value) of the magnetic field at the center 71', 72' of the front and rear faces of the armature coils 7' in FIG. 6 (0.45 T), turned towards the element 3'. It can also be seen in FIG. 5 that the maximum value of the magnetic flux taken transversely next to the armature 7 (points 73 and 74 in FIG. 5) is substantially identical to the maximum value of the magnetic flux next to the armatures 7' (points 73', 73'', 74', 74'') in FIG. 6.

Thanks to the invention, a reduction of 44% in the minimum value of the magnetic flux in the armature 7 is therefore obtained while having a large maximum value of the magnetic flux in the armature. This allows an increase in the torque of the rotors 7 of 25%. Thanks to the invention, an increase in the modulation of the magnetic flux in the armature(s) 7, and therefore an increase in the production of electricity in the armature(s) 7 are thus obtained.

FIG. 7 represents:

the curve C1 of the axial component $B_z$ (expressed in T on the ordinate and calculated via the three-dimensional finite element electromagnetic model described above) of the magnetic induction generated by a machine 1 according to the first example aforementioned according to the invention at a point located at an average radius of the rotors 2 with respect to the axis AX (located axially facing the elements 3 of the rotors 2 and facing one of the armature windings 7 during the rotation of the rotors 2) and at the center of the air gap between one of the rotors 2 and an armature 5, as a function of the angular rotational position (expressed in radians) of the rotors 2 on the abscissa, as well as:

the curve C2 of the axial component $B_z$ (expressed in T on the ordinate and calculated via the three-dimensional finite element electromagnetic model described above) of the magnetic induction, generated by another machine according to the second comparative example aforementioned, not entering within the framework of the invention, whose single rotor is located axially between two single armatures according to the aforementioned comparative example, taken at a point located at an average radius of the rotor with respect to the axis AX (located axially facing superconducting axial flux barrier pads of the rotor 2 and facingone of the armature windings during the rotation of the rotor 2) and at the center of the air gap between the rotor and one of the armatures, as a function of the angular rotational position (expressed in radians) of its rotor on the abscissa.

It can be seen in FIG. 7 that axially facing the superconducting axial magnetic flux barrier elements 3, the magnetic flux is reduced by 95% between its maximum value and its minimum value on the curve C2 for the comparative machine, whereas the magnetic flux is reduced by 99% between its maximum value and its minimum value on the curve C1 for the machine according to the invention.

FIG. 8 represents:

the curve C3 of the axial component $B_z$ (expressed in T on the ordinate and calculated via the three-dimensional finite element electromagnetic model described previously) of the magnetic induction generated by a machine 1 according to the aforementioned first example according to the invention at a point located at an average radius of the rotors 2 with respect to the axis A and on the turns of one of the armature windings 7 furthest from the elements 3 during the rotation of the rotors, as a function of the angular rotational position (expressed in radian) of the rotors 2 on the abscissa, as well as:

the curve C4 of the axial component $B_z$ (expressed in T on the ordinate and calculated via the three-dimensional finite element electromagnetic model described above) of the magnetic induction, generated by the aforementioned second comparative example of another comparative machine at one point located at an average radius of the rotors 2 with respect to the axis AX and on the turns of one of the armature windings 7 furthest from its elements, as a function of the angular rotational position (expressed in radians) of its rotor on the abscissa.

It can be seen in FIG. 8 that on the armature windings 7, the magnetic flux varies between the maximum value of 1.4 T and the minimum value of 0.06 T on the curve C3 for the machine according to the invention, i.e. a variation of 1.34 T which is 45% greater than the variation of 0.92 T between the maximum value of 1.26 T and the minimum value of 0.34 T on the curve C4 for the comparative machine. Consequently, the invention allows increasing the shield effect by 45% and increasing the torque by 25% with respect to the comparative machine having a configuration according to the state of the art. This also results in an increase in the power of the machine 1 according to the invention, while making it possible to have an identical cryogenic cooling enclosure.

In one embodiment represented in FIGS. 1 to 4, one or several or all of the superconducting axial magnetic flux barrier element(s) 3 comprise(s) or is/are formed of a full axial magnetic flux barrier pad made of superconducting material, whose extent is delimited by its external edge 31. The full axial magnetic flux barrier pad 3 can be cylindrical around a direction parallel to the axis of rotation AX, for example circular cylindrical.

In another embodiment not represented, one or several or all of the superconducting axial magnetic flux barrier element(s) 3 comprise(s) or is/are formed of one or several axial magnetic flux barrier loop(s) made of superconducting material, whose extent is delimited by its external edge.

On each rotor 2, the superconducting axial magnetic flux barrier elements 3 are fixed in through openings of an electrically insulating support 9 forming part of the rotor 2. This support 9 is fixed to the axis of rotation AX and can be formed of a planar plate, for example circular around the axis AX. In one embodiment represented in FIGS. 1 and 2, one or several or all of the axial magnetic flux passage area(s) 4 comprise(s) or is/are formed of part of the support 9 made of the electrically insulating material. In one embodiment represented in FIG. 3, one or several or all of the axial magnetic flux passage area(s) 4 comprise(s) or is/are formed of another gaping opening in the support 9.

In one embodiment represented in FIGS. 1 to 17, one or several or all of the armature windings 7 comprise(s) or is/are formed of a superconducting winding (first case).

In another embodiment represented in FIGS. 1 to 17, one or several or all of the armature winding(s) 7 comprise(s) or is/are formed of a conductive and not superconducting winding, which may be copper or the like (second case).

In one embodiment represented in FIGS. 1 to 3, 12, 14 and 16, the superconducting inductor coil 6 has an axial extent L, which surrounds both the rotors 2 (and therefore also surrounds the superconducting axial magnetic flux barrier elements 3), and the armature(s) 5 in the tangential direction DC around the axis of rotation AX. This further reduces the demagnetizing magnetic field and increases the level of induction. A single superconducting inductor coil 6 can be provided.

The superconducting axial magnetic flux barrier elements 3 can be cooled by a first cooling device, not represented, with circulation of cryogenic fluid, which can be for example helium, in particular in the embodiments of FIGS. 12 to 17, described below. The superconducting inductor coil 6 can be cooled by a second cooling device, not represented, with circulation of cryogenic fluid, which can be for example helium, in particular in the embodiments of FIGS. 12 to 17, described below. The cooling of the superconducting inductor coil 6 can be achieved by the same fluid circulating in series in the vicinity of the superconducting inductor coil 6 and of the superconducting axial magnetic flux barrier elements 3 of the rotors 2, in particular in the embodiments of FIGS. 12 to 17, described below. When, in addition, the superconducting axial magnetic flux barrier elements 3 are superconducting pads, these superconducting elements 3 have a higher temperature tolerance than the superconducting coil 6, and the fluid (helium) cools the superconducting inductor coil 6 before the superconducting pads 3, in particular in the embodiments of FIGS. 12 to 17, described below and in the first and second cases described below. The rotors 2 can be placed inside a vacuum cryogenic enclosure, for example according to one of the embodiments described below with reference to FIGS. 12 to 17. The vacuum allows ensuring the absence of exchanges of heat by convection between the surfaces of the enclosure and the rotors 2, and therefore thermal insulation, in particular in the embodiments of FIGS. 12 to 17, described below.

The cryogenic cooling enclosures of the embodiments described below can contain the coolant fluid. This coolant fluid can be for example helium, or other. The cooling of the superconducting axial magnetic flux barrier elements 3 in rotation can be carried out by means of a rotating collector circulating the helium inside copper channels in contact with these elements 3, in particular in the cryogenic cooling enclosure 10 of the embodiment of FIGS. 12 and 13, in the cryogenic cooling enclosure 12 of the embodiment of FIGS. 14 and 15, in the cryogenic cooling enclosure 13 of the embodiment of FIGS. 16 and 17 and in the cryogenic cooling enclosure 14 of the embodiment of FIGS. 16 and 17, described below and in the fourth cryogenic cooling enclosure described below. The cryogenic cooling enclosures of the embodiments described below can operate at different temperatures from each other.

According to a first case of cooling, the cryogenic cooling enclosures 10, 11, 12, 13, 14 of the embodiments of FIGS. 12 to 17 can be arranged and/or connected, from the point of view of the circulation of the coolant fluid, so that the coolant fluid first cools the superconducting inductor coil 6, then the armature windings 7 of the armature 5, and then the rotors 2, 21, 22 and/or 23 (superconducting axial magnetic flux barrier elements 3), in the first case where the armature windings 7 comprise one (or several) superconducting armature winding(s) 7. The cooling order of the enclosures is from coldest to warmest, because the coolant fluid will heat up during cooling.

According to a second case of cooling, the cryogenic cooling enclosures 10, 11, 12, 13, 14 of the embodiments of FIGS. 12 to 17 can be arranged and/or connected, from the point of view of the circulation of the coolant fluid, so that the coolant fluid first cools the superconducting inductor coil 6, then the rotors 2, 21, 22 and/or 23 (superconducting axial magnetic flux barrier elements 3), and then the armature windings 7 of the armature 5, in the second case where the armature windings 7 are formed of conductive and not superconducting windings 7. The cooling order of the enclosures is from coldest to warmest, because the coolant fluid will heat up during cooling.

In the second case, the armature windings 7 formed of conductive and not superconducting windings 7 of the armature 5 will typically operate at higher temperatures (possibly being on the order of 100 K) than in the first case of the armature windings 7 comprising one (or several) superconducting armature winding(s) 7, which must be cooled below their critical temperature <100K, for example at a temperature that can be 70K or 50K). The comparison performed regarding the improvement in the torque for a configuration according to the second comparative example compared with a configuration according to the first example according to the invention is accompanied by an improvement in the machine power of the machine, which is proportional only for a completely superconducting machine. In this case, the size of the cryogenic enclosure remains relatively the same.

In one embodiment represented in FIGS. 12 and 13, the machine 1 comprises a cryogenic cooling enclosure 10, inside which the rotors 2, the armature(s) 5 and the superconducting inductor coil 6 are placed, in the case where the armature windings 7 are also superconducting.

In one embodiment represented in FIGS. 14 and 15, the superconducting inductor coil 6 is placed in a first cryogenic cooling enclosure 11 in the form of an annular bushing around the axis of rotation AX. The superconducting inductor coil 6 is located in a first housing space 113 of the enclosure 13, located between a first external wall 111 of the first enclosure 11 and a second internal annular wall 112 of the first enclosure 11, which delimit it radially. This first housing space 113 is separate from a second space 114 located radially inside the second internal annular wall 11. In this second interior space 114 is placed a second cryogenic cooling enclosure 12 in which the rotors 2 and the armature(s) 5 are located in case the armature windings 7 are also superconducting. The second cryogenic cooling enclosure 12 has a circular cylindrical shape around the axis of rotation AX and is delimited radially by a third external wall 121 located inside the second internal annular wall 112. The fact of having several enclosures allows more efficient cooling: each enclosure is cooled to the temperature required by the parts located inside the enclosures.

According to one embodiment, the first cryogenic cooling enclosure 11 of the embodiment of FIGS. 14 and 15 comprises one (or several) first coolant fluid introduction inlet(s) connected to a source sending it the coolant fluid, and one (or several) first coolant fluid ejection outlet(s). The first coolant fluid ejection outlet or one (or several or all) of the first coolant fluid ejection outlet(s) is/are connected to one (or several) second coolant fluid introduction inlet(s) of the second cryogenic cooling enclosure 12. The second cryogenic cooling enclosure 12 comprises one (or several) second coolant fluid ejection outlet(s).

The (or one or several or all of the) second coolant fluid introduction inlet(s) of the second cryogenic cooling enclosure 12 can be closer to the armature(s) 5 than to the rotors 2, 21, 22 and/or 23, in the first case where the armature windings 7 comprise one (or several) superconducting armature winding(s) 7, in order to implement the first case of cooling mentioned above. The (or one or several or all of the) second coolant fluid ejection outlet(s) can be closer to the rotors 2, 21, 22 and/or 23 than to the armature(s) 5, in the first case where the armature windings 7 comprise one (or several) superconducting armature winding(s) 7, in order to implement the first case of cooling mentioned above.

The (or one or several or all of the) second coolant fluid introduction inlet(s) of the second cryogenic cooling enclosure 12 can be closer to the rotors 2, 21, 22 and/or 23 than to the armature(s) 5, in the second case where the armature windings 7 are formed of conductive and not superconducting windings 7, in order to implement the second case of cooling mentioned above. The (or one or several or all of the) second coolant fluid ejection outlet(s) can be closer to the armature(s) 5 than to the rotors 2, 21, 22 and/or 23, in the second case where the armature windings 7 are formed of conductive and not superconducting windings 7, in order to implement the second case of cooling mentioned above.

In one embodiment represented in FIGS. 16 and 17, the first enclosure 11 is similar to that of the embodiment described above with reference to FIGS. 14 and 15. In the second interior space 114 is placed a second cryogenic cooling enclosure 13 in which the first rotor 21 is placed without the armature 5, and a third cryogenic cooling enclosure 14 in which the second rotor 22 is placed without the armature 5, in the second case where the armature windings 7 are not superconducting. The second cryogenic cooling enclosure 13 has a circular cylindrical shape around the axis of rotation AX and is delimited radially by a third external wall 131 located inside the second internal annular wall 112. The third cryogenic cooling enclosure 14 has a circular cylindrical shape around the axis of rotation AX and is delimited radially by a fourth external wall 141 located inside the second internal annular wall 112. The third cryogenic cooling enclosure 14 is distinct and located axially at a distance of the second cryogenic cooling enclosure 13. In the second interior space 114 and between the second cryogenic cooling enclosure 13 and the third cryogenic cooling enclosure 14 is located the armature 5. For example, a cryogenic enclosure 13 or 14 is provided around each rotor 2 of the machine 1. The machine 1 can thus comprise N cryogenic cooling enclosures 13, 14 in which the N rotors 2 are placed respectively. The armature windings 7 can be inserted between the external transverse surfaces of two different enclosures 13 and 14, for example according to the embodiment described below with reference to FIG. 11. In the first case where the armature windings 7 comprise one (or several) superconducting armature winding(s) 7, each armature 5 is placed in a fourth cryogenic cooling enclosure, which is located between the second cryogenic cooling enclosure 13 and the third cryogenic cooling enclosure 14, which has a circular cylindrical shape around the axis of rotation AX and which is delimited radially by a fourth external wall located inside the second internal annular wall 112. The fact of having several enclosures allows more efficient cooling: each enclosure is cooled to the temperature required by the parts located inside the enclosures.

According to one embodiment, the first cryogenic cooling enclosure 11 of the embodiment of FIGS. 16 and 17 comprises one (or several) first coolant fluid introduction inlet(s) connected to a source sending it the coolant fluid, and one (or several) first coolant fluid ejection outlet(s). The second cryogenic cooling enclosure 13 comprises one (or several) second coolant fluid introduction inlet(s) and one (or several) second coolant fluid ejection outlet(s). The third cryogenic cooling enclosure 14 comprises one (or several) third coolant fluid introduction inlet(s) and one (or several) third coolant fluid ejection outlet(s). In the first case, the fourth cryogenic cooling enclosure comprises one (or several) fourth coolant fluid introduction inlet(s) and one (or several) fourth coolant fluid ejection outlet(s).

In the first case where the armature windings 7 comprise one (or several) superconducting armature winding(s) 7, in order to implement the first case of cooling mentioned above, the (or one or several or all of the) first coolant fluid ejection outlet(s) of the first cryogenic cooling enclosure 11 of the superconducting inductor coil 6 is/are connected to the (or one or several or all of the) fourth coolant fluid introduction inlet(s) of the fourth cryogenic cooling enclosure (armature 5). The (or one or several or all of the) fourth coolant fluid ejection outlet(s) of the fourth cryogenic cooling enclosure (armature 5) is/are connected to the (or several or all of the) second coolant fluid introduction inlet(s) of the second cryogenic cooling enclosure 13 and to the (or one or several or all of the) third coolant fluid introduction inlet(s) of the third cryogenic cooling enclosure 14, in the first case where the armature windings 7 comprise one (or several) superconducting armature winding(s) 7, in order to implement the first case of cooling mentioned above.

In the second case where the armature windings 7 are formed of conductive and not superconducting windings 7, in order to implement the second case of cooling mentioned above, the (or one or several or all of the) first coolant fluid ejection outlet(s) is/are connected to the (or one or several or all of the) second coolant fluid introduction inlet(s) of the second cryogenic cooling enclosure 13 and to the (or one or several or all of the) third coolant fluid introduction inlet(s) of the third cryogenic cooling enclosure 14. In the second case, forced air or liquid cooling devices can be envisaged to cool the armature windings 7. For example, a crown on the external and/or internal radial peripheries of the armature windings 7 is well suited to a cooling device by circulation of a liquid in the second case.

In the embodiment of FIG. 11, the armature windings 7 of an armature 5 can be fixed on a cryostat cap 35 (for example made of ceramic) of the enclosure 13 and/or 14 in the form of a ring around the axis AX, one transverse face of which comprises notches 36 in which the armature windings 7 are respectively mounted. This system can in particular allow serving as a mechanical support for the coils in the absence of a magnetic yoke (iron-free machine). Channels and fins can be integrated into the cryostat cap 34 in order to improve the cooling.

The machine 1 according to the invention, and particularly the machine according to the embodiment described above with N≥3 rotors and N-1≥2 armatures with reference to FIG. 2, called machine with several stacks of rotors 2, is well suited to very high power machines with volume constraints (for example maximum external radius), or to fully superconducting topologies, as the armatures and rotors can all be placed inside a single cryogenic enclosure.

In the axial flux electric machine 1, the addition of a stack according to FIG. 2 increases the power and also the mass. The mass power of the machine is increased. Indeed, the stack of rotors 2 leads to an increase in the length L of the inductor coil 6 (operation in generator mode). This lengthening of the coil 6 results in the reduction of the demagnetizing magnetic field $H_d$, which increases the level of the induction at the heart of the machine 1 and therefore its mass power.

The magnetic induction created by a solenoid S traversed by a current density J can be solved by an Amperian or Coulombian approach, with reference to FIG. 9. The demagnetizing field is typically Coulombian, the magnetic surface charges are written:

$\sigma_s(r)=\mu_0 J(R_2-R_1)$ for $0<r<R_1$ $\sigma_s(r)=\mu_0 J(R_2-r)$ for $R_1<r<R_2$ $\sigma_s(r)=0$ for $r>R_2$ For a distribution of charges distributed over a surface $\Sigma$, the demagnetizing magnetic field $H_d$ is given at a point M by:

$$H_d(M) = \iint_\Sigma \frac{\sigma_S}{4\pi\varepsilon_0 PM} d^2S$$

where P is a point on the surface $\Sigma$. In the absence of an external magnetic field source, the total magnetic field vector H is simply written by:

$H=H_d$

Finally, the expression of the induction vector B is:

$B=\mu_0(H+M)=\mu_0(H_d+M)$

Vectorically, the demagnetizing magnetic field $H_d$ is opposed to the magnetization M of the solenoid, which explains the demagnetizing nature. By increasing the length L of the superconducting coil 6, the distance PM of the 5 expression above of the demagnetizing magnetic field $H_d$ increases and decreases the demagnetizing magnetic field $H_d$. Thus in view of the expression of B, the total induction increases and therefore the torque/power set of the machine also. A coefficient k can be used to represent the evolution of the induction as a function of the number of rotors 2 in the machine 1 according to the invention, such that:

$$k = \frac{B_{zN}}{B_{z1}}$$

where $B_{z1}$ is the induction for an axial flux machine comprising a single rotor and a single armature and $B_{zN}$ the induction of a machine 1 according to the invention comprising N rotors. The induction is proportional to this coefficient k. The increase in torque and power of the machine 1 is also proportional to this coefficient k.

FIG. 10 represents the evolution of the coefficient k (and therefore of the induction) as a function of the number (N-1) of stacks of rotors 2. This curve C5 was obtained by the interpolation of results obtained for calculations with finite elements of the machine 1 according to the invention comprising different numbers N-1 of stacks of rotors 2. It can be seen that the coefficient k and the mass power of the machine 1 are doubled for N=3 (point P1 on the curve C5) and more than tripled for N=9 (point P2 on the curve C5). The curve C5 has been determined as being for example of the form:

$$K=B_{zN}/B_{z1}=A.(N.F)^D-C$$

In the aforementioned example of the machine 1 according to the invention having the aforementioned parameters, $A=9.03T^{-1}.m^{-1}$, $D=0.1372$, $C=5.15$ and $F=0.06$ m. Of course, the coefficients A, D, C and F can be different for other values of the parameters of the machine 1 according to the invention.

The invention can be used for the electric machines 1 comprising flux barriers (full superconducting pads or short-circuited superconducting strips).

The technical field of use of the invention falls within the context of the electrification of aircrafts. Preparing for the installation of increasingly powerful electric systems for the electric or hybrid propulsion requires designing electric motors capable of competing, exceeding or improving the performance of the heat engines. The electric aircraft will require power densities of electric machines greater than 20 kW/kg. The use of superconducting materials represents a key tool to achieve these power densities. The invention can be used for electric machines comprising flux barriers 3 (full superconducting pads or short-circuited superconducting strips). The invention applies to entirely superconducting machines (superconducting armature 3 and inductor 6) but also to partially superconducting machines (superconducting armature 3 or inductor 6).

The rotating electric machine 1 can form part of an aircraft and have the at least two external electric terminals of the armature windings 7 which are connected to an electricity-consuming member or an electricity-generating member. This consuming or generating member can be located, for example, in one or several propulsion turbomachine(s) of the aircraft. In case the rotating electric machine 1 operates in electricity-generating mode, the rotating electric machine 1 can have the at least two external electric terminals of the armature windings 7 which are connected to an electricity-consuming member or to a connection circuit (which can be for example with controllable switching) itself connected by electric conductors to an electricity-consuming member, so that the electricity-generating rotating electric machine 1 can supply this consuming member with electricity. In case the rotating electric machine 1 operates in motor mode, the rotating electric machine 1 can have the at least two external electric terminals of the armature windings 7 which are connected to the electricity-generating member or to a connection circuit (which can be for example with controllable switching) itself connected by electric conductors to the electricity-generating member, so that the rotating electric machine 1 can be supplied with electricity by this generator member. Of course, the embodiments, characteristics, possibilities and examples described above can be combined with each other or selected independently of each other.

The invention claimed is:

1. A rotating electric machine, comprising:
at least one rotor comprising a set of superconducting axial magnetic flux barrier elements distributed in a plane perpendicular to an axis of rotation in a tangential direction about the axis of rotation,
said superconducting axial magnetic flux barrier elements being spaced by axial magnetic flux passage areas distributed in the tangential direction about the axis of rotation,
at least one armature, comprising armature windings distributed in the tangential direction about the axis of rotation,
at least one superconducting inductor coil surrounding the superconducting axial magnetic flux barrier elements and the at least one armature in the tangential direction about the axis of rotation,
the at least one superconducting inductor coil being able to induce an axial magnetic field directed along the axis of rotation,
the at least one rotor being rotatably mounted on the axis of rotation with respect to the armature and to the at least one inductor coil,
wherein the at least one rotor including: at least one first rotor and at least one second rotor, and the set of superconducting axial magnetic flux barrier elements including: superconducting axial magnetic flux barrier elements of the at least one first rotor, and superconducting axial magnetic flux barrier elements of the at least one second rotor,
the at least one first rotor and the at least one second rotor being spaced from each other along the axis of rotation,
the at least one armature being positioned between the at least one first rotor and the at least one second rotor,
the superconducting axial magnetic flux barrier elements of the at least one first rotor being coaxial at least partly with the superconducting axial magnetic flux barrier elements of the at least one second rotor,
the axial magnetic flux passage areas of the at least one first rotor being coaxial at least partly with the axial magnetic flux passage areas of the at least one second rotor,
the rotating electric machine comprising a first cryogenic cooling enclosure that has an annular shape about the axis of rotation and is delimited radially by a first external wall and by a second internal annular wall, the at least one superconducting inductor coil being located in the first cryogenic cooling enclosure between the first external wall and the second internal annular wall,
the rotating electric machine comprising a second cryogenic cooling enclosure that has a circular cylindrical shape about the axis of rotation and is delimited radially by a third external wall located inside the second internal annular wall, the at least one first rotor, the at least one second rotors and the at least one armature being located in the second cryogenic cooling enclosure.

2. A rotating electric machine, comprising:
at least one rotor comprising a set of superconducting axial magnetic flux barrier elements distributed in a plane perpendicular to an axis of rotation in a tangential direction about the axis of rotation,
said superconducting axial magnetic flux barrier elements being spaced by axial magnetic flux passage areas distributed in the tangential direction about the axis of rotation,
at least one armature, comprising armature windings distributed in the tangential direction about the axis of rotation,
at least one superconducting inductor coil surrounding the superconducting axial magnetic flux barrier elements and the at least one armature in the tangential direction about the axis of rotation, the at least one superconducting inductor coil being able to induce an axial magnetic field directed along the axis of rotation, the at least one rotor being rotatably mounted on the axis of rotation with respect to the armature and to the at least one inductor coil, wherein the at least one rotor including: at least one first rotor and at least one second rotor, and the set of superconducting axial magnetic flux barrier elements including: superconducting axial magnetic flux barrier elements of the at least one first rotor, and superconducting axial magnetic flux barrier elements of the at least one second rotor, the at least one first rotor and the at least one second rotor being spaced from each other along the axis of rotation, the at least one armature being positioned between the at least one first rotor and the at least one second rotor, the superconducting axial magnetic flux barrier elements of the at least one first rotor being coaxial at least partly with the superconducting axial magnetic flux barrier elements of the at least one second rotor, the axial magnetic flux passage areas of the at least one first rotor being coaxial at least partly with the axial magnetic flux passage areas of the at least one second rotor, the rotating electric machine comprising a first cryogenic cooling enclosure that has an annular shape about the axis of rotation and is delimited radially by a first external wall and by a second internal annular wall, the at least one superconducting inductor coil being located in the first cryogenic cooling enclosure between the first external wall and the second internal annular wall, the rotating electric machine comprising at least one second cryogenic cooling enclosure that has a circular cylindrical shape about the axis of rotation and which is delimited radially by a third external wall located inside the second internal annular wall, the at least one first rotor being located in the second cryogenic cooling enclosure, the rotating electric machine comprising at least one third cryogenic cooling enclosure that has a circular cylindrical shape about the axis of rotation, which wherein said at least one third cryogenic cooling enclosure is located axially at a distance from the second cryogenic cooling enclosure and is delimited radially by a fourth external wall located inside the second internal annular wall, the at least one second rotor being located in the third cryogenic cooling enclosure, the at least one armature being located between the second cryogenic cooling enclosure and the third cryogenic cooling enclosure.

3. The rotating electric machine according to claim 1, wherein the at least one second rotor comprises an armature on either side.

4. The rotating electric machine according to claim 3, comprising N rotors comprising on either side of each of the rotors an armature, N being a natural number greater than or equal to 2.

5. The rotating electric machine according to claim 1, comprising N armatures comprising on either side of each of the armatures a rotor, N being a natural integer greater than or equal to 2.

6. The rotating electric machine according to claim 1, wherein the superconducting axial magnetic flux barrier elements of the at least one first rotor are aligned along the axis of rotation with the superconducting axial magnetic flux barrier elements of the at least one second rotor, and the axial magnetic flux passage areas of the at least one first rotor are aligned along the axis of rotation with the axial magnetic flux passage areas of the at least one second rotor.

7. The rotating electric machine according to claim 1, wherein the armature windings comprise at least one superconducting armature winding.

8. The rotating electric machine according to claim 1, wherein the armature windings comprise at least one conductive winding.

9. The rotating electric machine according to claim 1, wherein the at least one superconducting inductor coil has an axial extent that surrounds the plurality of the rotors and the at least one armature in the tangential direction about the axis of rotation.

10. The rotating electric machine according to claim 7, wherein the rotating electric machine comprises a single superconducting inductor coil.

11. The rotating electric machine according to claim 1, wherein at least one of the superconducting axial magnetic flux barrier elements comprises at least one full superconducting axial magnetic flux barrier pad.

12. The rotating electric machine according to claim 1, wherein at least one of the superconducting axial magnetic flux barrier elements comprises at least one superconducting axial magnetic flux barrier loop.

13. The rotating electric machine according to claim 2, wherein the armature windings are fixed on a cryostat cap of the second cryogenic cooling enclosure and/or of the third cryogenic cooling enclosure in the form of a ring about the axis, one transverse face of the cryostat cap comprises notches in which the armature windings are respectively mounted.

14. An aircraft, comprising an electricity-consuming member and a rotating electric machine according to claim 1, which is connected to a circuit for connection to the electricity-consuming member to allow supplying the electricity-consuming member with electricity.

15. An aircraft, comprising an electricity-generating member and a rotating electric machine according to claim 1, wherein the rotating electric machine is connected to a circuit for connection to the electricity-generating member so that the rotating electric machine can be supplied with electricity by the electricity-generating member.

16. The rotating electric machine according to claim 2, wherein the at least one second rotor comprises an armature on either side.

17. The rotating electric machine according to claim 16, comprising N rotors comprising on either side of each of the rotors an armature, N being a natural number greater than or equal to 2.

18. The rotating electric machine according to claim 2, comprising N armatures comprising on either side of each of the armatures a rotor, N being a natural integer greater than or equal to 2.

19. The rotating electric machine according to claim 2, wherein the superconducting axial magnetic flux barrier elements of the at least one first rotor are aligned along the axis of rotation with the superconducting axial magnetic flux barrier elements of the at least one second rotor, and the axial magnetic flux passage areas of the at least one first rotor are aligned along the axis of rotation with the axial magnetic flux passage areas of the at least one second rotor.

20. The rotating electric machine according to claim 2, wherein the armature windings comprise at least one superconducting armature winding.

21. The rotating electric machine according to claim 2, wherein the armature windings comprise at least one conductive winding.

22. The rotating electric machine according to claim 2, wherein the at least one superconducting inductor coil has an axial extent which that surrounds the plurality of the rotors and the at least one armature in the tangential direction about the axis of rotation.

23. The rotating electric machine according to claim 2, wherein the rotating electric machine comprises a single superconducting inductor coil.

24. The rotating electric machine according to claim 2, wherein at least one of the superconducting axial magnetic flux barrier elements comprises at least one full superconducting axial magnetic flux barrier pad.

25. The rotating electric machine according to claim 2, wherein at least one of the superconducting axial magnetic flux barrier elements comprises at least one superconducting axial magnetic flux barrier loop.

26. An aircraft, comprising an electricity-consuming member and a rotating electric machine according to claim 2, which is connected to a circuit for connection to the electricity-consuming member to allow supplying the electricity-consuming member with electricity.

27. An aircraft, comprising an electricity-generating member and a rotating electric machine according to claim 2, wherein the rotating electric machine is connected to a circuit for connection to the electricity-generating member so that the rotating electric machine can be supplied with electricity by the electricity-generating member.

* * * * *